United States Patent
Stephenson et al.

(10) Patent No.: US 7,912,023 B2
(45) Date of Patent: *Mar. 22, 2011

(54) BATTERY-EFFICIENT GENERIC ADVERTISING SERVICE FOR WIRELESS MOBILE DEVICES

(75) Inventors: David Sheldon Stephenson, San Jose, CA (US); Robert B. O'Hara, Jr., Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 65 days.

This patent is subject to a terminal disclaimer.

(21) Appl. No.: 12/403,050

(22) Filed: Mar. 12, 2009

(65) Prior Publication Data

US 2009/0175207 A1  Jul. 9, 2009

Related U.S. Application Data

(63) Continuation of application No. 11/406,005, filed on Apr. 18, 2006, now Pat. No. 7,535,884.

(51) Int. Cl.
*H04B 7/185* (2006.01)
(52) U.S. Cl. ......... 370/338; 370/311; 370/318; 455/522
(58) Field of Classification Search .................. 370/310, 370/311, 318, 328, 338, 352, 277, 392, 395.21, 370/395.3, 395.52; 455/422.1, 452.2, 522, 455/69, 574; 713/320
See application file for complete search history.

(56) References Cited

U.S. PATENT DOCUMENTS

| 7,072,697 | B2 | 7/2006 | Lappetelainen et al. |
| 7,146,130 | B2 | 12/2006 | Hsu et al. |
| 7,535,884 | B2 * | 5/2009 | Stephenson et al. .......... 370/338 |
| 7,564,810 | B2 | 7/2009 | Hernandez et al. |
| 7,583,643 | B2 * | 9/2009 | Smith et al. .................... 370/338 |
| 7,778,593 | B2 | 8/2010 | Hsu et al. |
| 2003/0210658 | A1 | 11/2003 | Hernandez et al. |
| 2004/0176024 | A1 | 9/2004 | Hsu et al. |
| 2004/0223498 | A1 | 11/2004 | Sanderson et al. |
| 2005/0031108 | A1 | 2/2005 | Eshun et al. |
| 2005/0261970 | A1 | 11/2005 | Vucina et al. |
| 2005/0270993 | A1 * | 12/2005 | Rajamani et al. ............ 370/311 |
| 2007/0064660 | A1 | 3/2007 | Qi et al. |
| 2007/0093201 | A1 | 4/2007 | Hsu et al. |
| 2007/0097896 | A1 * | 5/2007 | Qi ................................. 370/311 |
| 2007/0201468 | A1 | 8/2007 | Jokela |

FOREIGN PATENT DOCUMENTS

| CN | 1495588 | 5/2003 |
| CN | 1754345 | 2/2004 |

OTHER PUBLICATIONS

Liu et al., "A Scheme for Supporting Voice Over" IEEE 802.11 Wireless Local Area Network, Proc. Natl Sci. Counc. ROC(A), vol. 25, No. 4, 2001, pp. 259-268, 2001.

(Continued)

*Primary Examiner* — Kamran Afshar
(74) *Attorney, Agent, or Firm* — Baker Botts L.L.P.

(57) ABSTRACT

In one embodiment, a method for acquiring service provider information includes querying a wireless network for service provider information, receiving an advertisement response containing advertising service scheduling information, and configuring a power conservation mode responsive to the advertising service scheduling information.

26 Claims, 12 Drawing Sheets

OTHER PUBLICATIONS

Rohl et al., "A Short Look on Power Saving Mechanisms in the Wireless LAN Standard Draft" IEEE 802.11, Telecommunications Networks Group, Technical University Berlin, 1997.
Notification of Transmittal of the International Search Report and the Written Opinion of the International Searching authority, or the Declaration for PCT/US07/66365 dated Aug. 19, 2008.
USPTO Communication for David Shelton Stephenson, et al., dated Aug. 11, 2008 for U.S. Appl. No. 11/406,005, filed Apr. 14, 2006 9 pages.
USPTO Communication for David Shelton Stephenson, et al., dated Dec. 8, 2008 for U.S. Appl. No. 11/406,005, filed Apr. 14, 2006 5 pages.
The First Office Action (PCT Application in Chinese National Phase), Application No. 200780009626.7, date received Oct. 28, 2010.

* cited by examiner

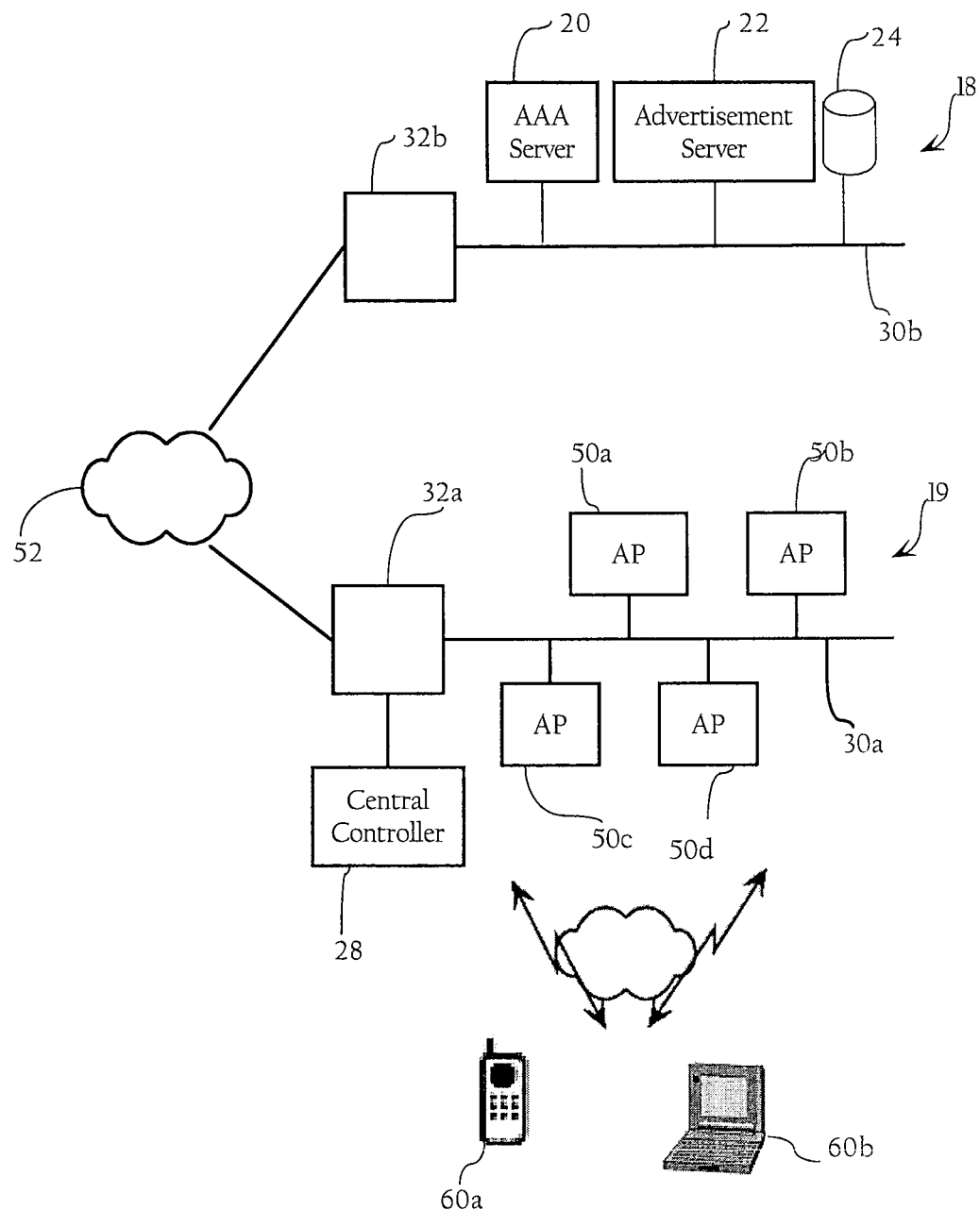
Fig._1A

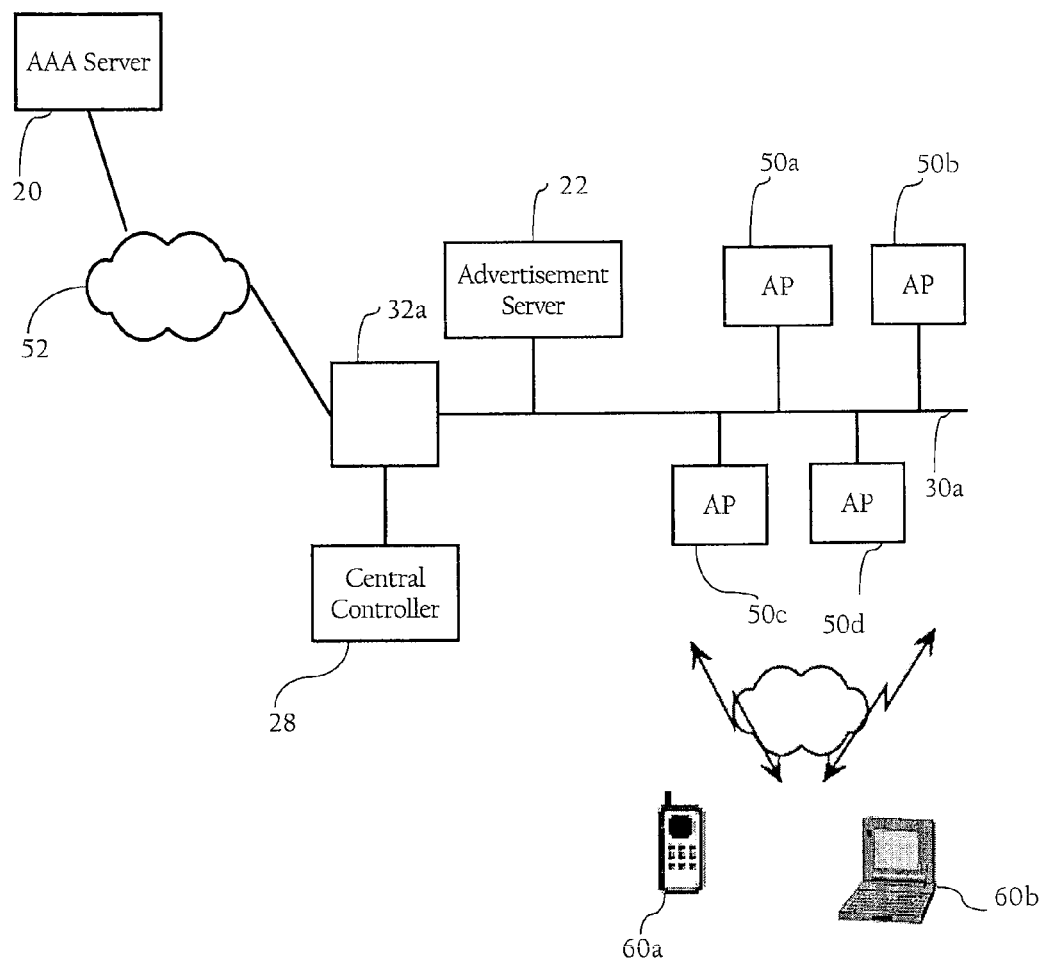
Fig._1B

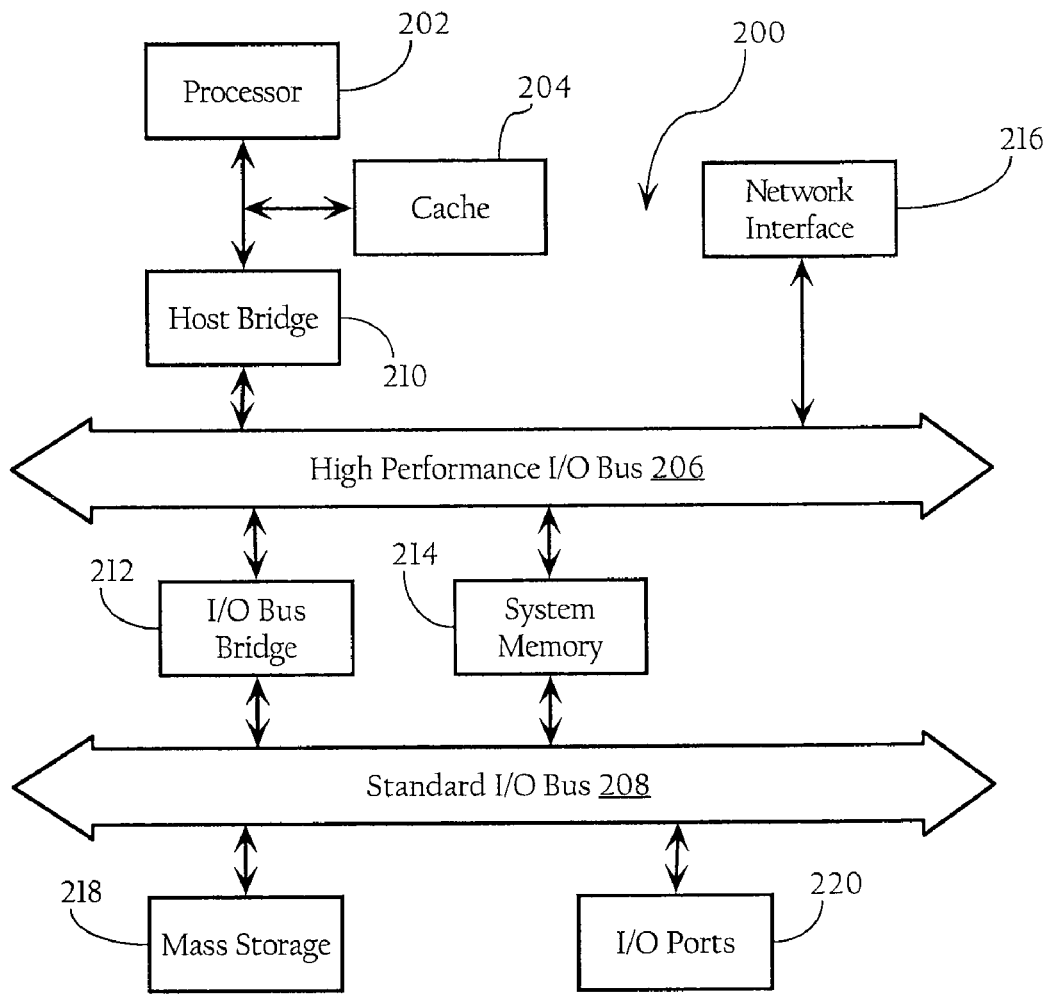
Fig._2

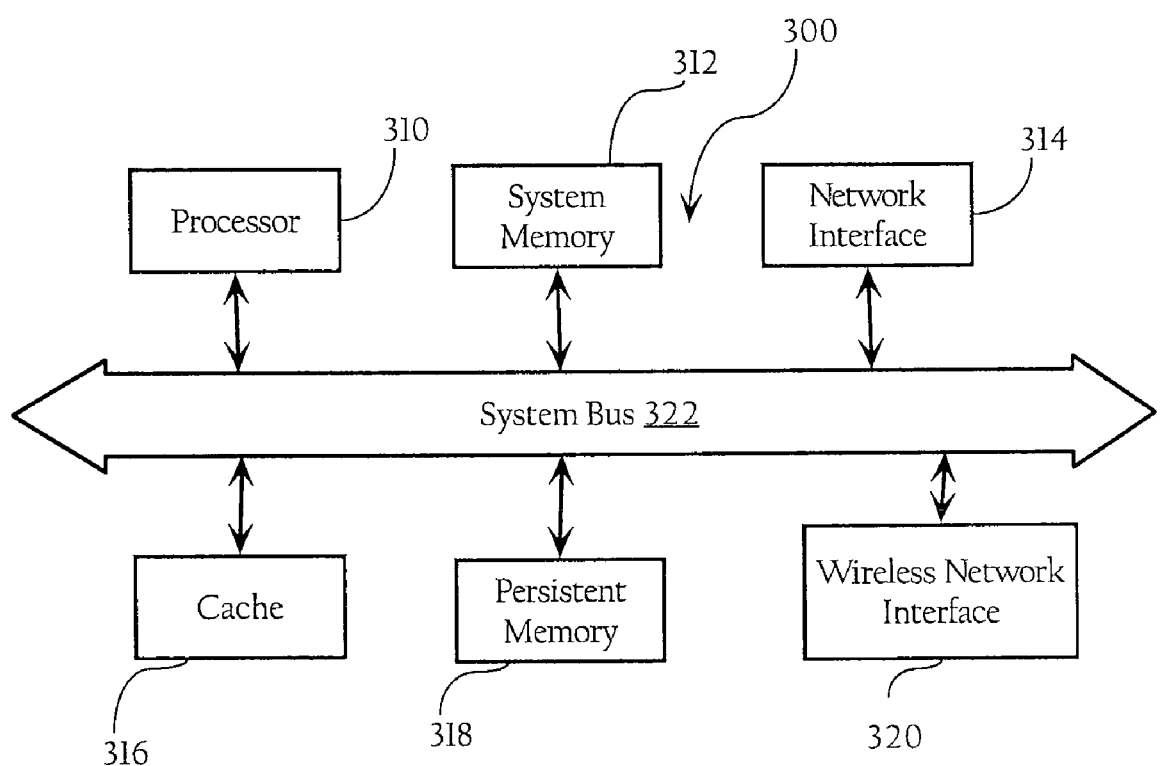
Fig._3

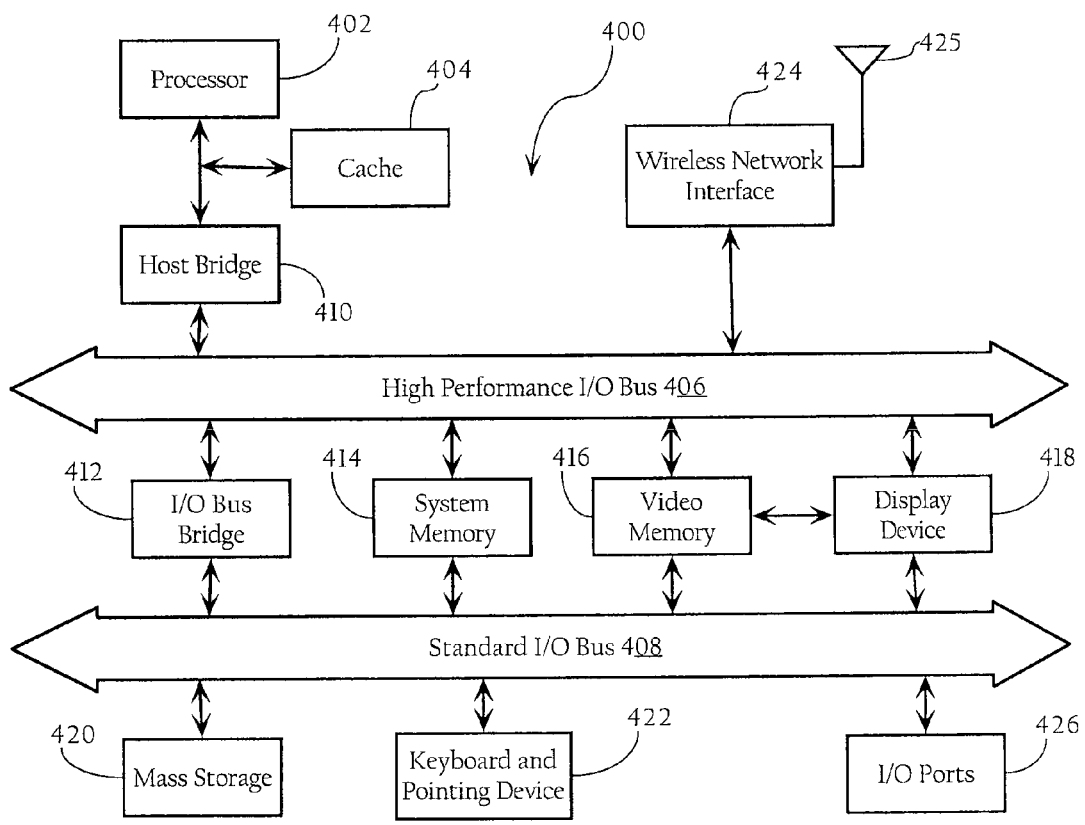
Fig._4

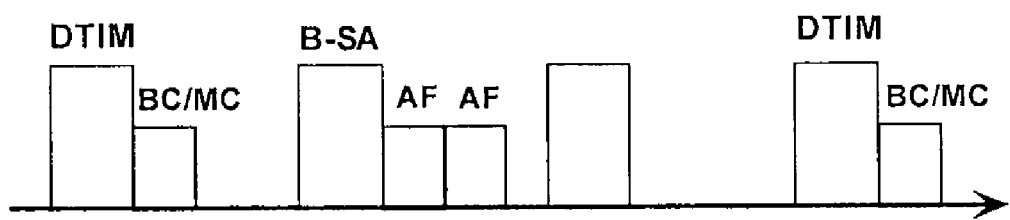
Fig._5

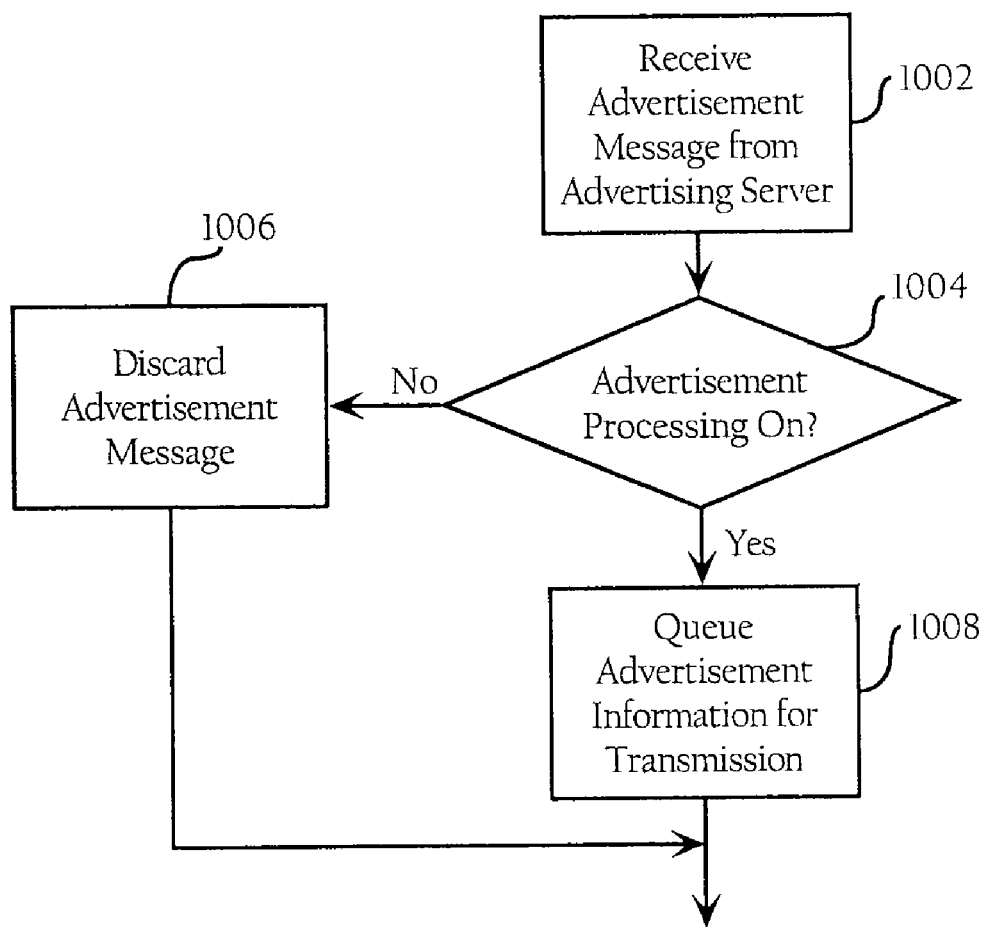
Fig._10

BATTERY-EFFICIENT GENERIC ADVERTISING SERVICE FOR WIRELESS MOBILE DEVICES

CROSS-REFERENCE TO RELATED APPLICATION

This application is a continuation of U.S. application Ser. No. 11/406,005 filed Apr. 18, 2006 and entitled "Battery-Efficient Generic Advertising Service for Wireless Mobile Devices".

FIELD OF THE INVENTION

The present invention relates to wireless networks and, more particularly, to methods, apparatuses, and systems directed to battery-efficient, advertising service in wireless networks.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

DESCRIPTION OF THE DRAWINGS

FIG. 1A is a topological diagram of the components in a wireless local area network (WLAN) system according to one implementation of the present invention.

FIG. 1B is a topological diagram of the components in a wireless local area network (WLAN) system according to another implementation of the present invention.

FIG. 2 illustrates for didactic purposes a hardware system, which may be used to implement an advertisement server.

FIG. 3 illustrates for didactic purposes a hardware system, which may be used to implement a wireless access point.

FIG. 4 illustrates for didactic purposes a hardware system, which may be used to implement a wireless client.

FIG. 5 illustrates the flow of a sequence of beacon transmissions according to one implementation of the present invention.

FIG. 10 is a flow chart illustrating a process flow, according to one implementation of the present invention, implemented at a wireless access point.

DESCRIPTION OF EXEMPLARY EMBODIMENTS

A. Overview

Figure 1C:
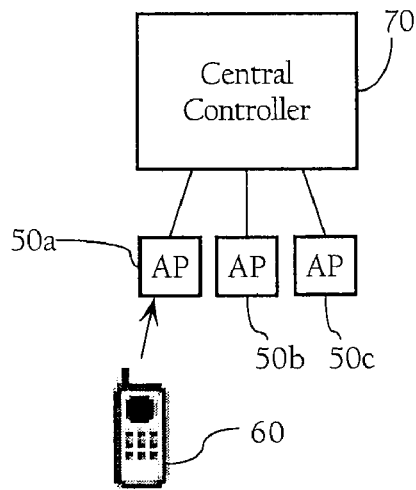
FIG. 1C illustrates a hierarchical wireless network including a central controller according to one implementation of the present invention.

Particular embodiments of the present invention facilitate generic advertising service in wireless networks. In one implementation, the present invention provides a generic advertising service system that allows wireless clients to conserve battery power. According to one implementation of the present invention, the wireless network infrastructure delivers advertisements for services provided by one or more service providers, which are either directly supported at a hotspot or supported via a roaming agreement with the hotspot operator. In one implementation of the invention, client devices are able to obtain information on the services available at a hotspot via advertising frames before associating with the network. This eliminates the need for the time consuming, battery intensive, trial and error process previously described. In one implementation, a by-product of this characteristic is that advertising frames are sent in cleartext; this contrasts to the transmissions to associated clients which are encrypted.

In one implementation, a wireless access point broadcasts or multicasts a start-of-advertisement (B-SA) beacon, which marks the start of advertising (i.e., transmission of advertisement frames (AFs), at regular intervals. B-SA beacons enable a wireless client to enter a power conservation or sleep mode while it waits for the time at which the wireless access point will transmit a B-SA beacon. Just before that time, the wireless client comes out of the power conservation mode to receive the B-SA beacon. Because the wireless client can enter the power conservation mode while waiting for the advertisements, its battery energy is conserved. In one implementation, the wireless client may scan and select one or more WLANs and request service provider information (e.g., an advertising service, if supported) by sending a probe request including an advertisement request information element (AR-IE). In one implementation, the wireless client receives a probe response containing advertising service scheduling information. Based on the scheduling information, the wireless client can enter a power conservation mode and then wake up just before the wireless access point transmits the B-SA beacon and, if any, subsequent advertisement frame(s) including information on supported services or subscription information.

In one implementation, if the wireless access point receives a probe request including an AR-IE, the wireless access point informs the wireless client whether the advertisement request is supported. In one implementation, if the advertisement request is supported, the wireless access point forwards an advertisement query to the advertisement server and, if accepted, receives AFs from the advertisement server and queues the AFs for transmission to the wireless client. In another implementation, if the advertisement request is supported, the wireless access point can turn on processing of advertisement information broadcasted or multicasted by the advertisement server and queues received information for transmission over the wireless medium.

In one implementation, a wireless client has fewer message exchanges with the wireless network infrastructure since the wireless client is not associated a wireless access point of the wireless network infrastructure. As a result, the wireless client has a more power-efficient method of obtaining generic advertising service information. In addition, fewer message exchanges provides for an efficient use of the air medium as the advertising service is only used upon request. For example, unless requested, the wireless network infrastructure does not advertise service provider information.

B. Exemplary Wireless Network System Architecture

B.1. Network Topology

A network environment including a wireless local area network (WLAN) according to one implementation of the present invention is shown in FIG. 1A. In a one embodiment of the present invention, the network environment includes one or more hotspots 19 and one or more network operation centers 18 that include functionality that supports the hotspots 19. As FIG. 1A shows, the network operations center 18 may comprise an Authentication Authorization and Account (AAA) server 20, an advertisement server 22, and a service provider database 24. In one implementation, the hotspot 19 may comprise one or more access points 50 and optionally a central controller 28, all interconnected by a local area network (LAN) 30a. Routers 32a and 32b allow for the transmission of messages between hotspot 19 and network operations center 18 over network 52. In one implementation, service provider database 24 maintains hotspot access and/or subscription information, as well as service provider or intercarrier roaming agreement information. In one implementation, advertisement server 22 is operative to provide service provider information to allow wireless clients 60a, 60b at hotspot 19 to determine whether they have credentials or access privileges sufficient to gain wireless network access. For example, network operations center 18 and hotspot 19 may correspond to a first wireless carrier (e.g., Verizon), which may, pursuant to a roaming agreement, allow users or subscribers of a second wireless carrier (e.g., T-Mobile users) wireless access at hotspot 19. In other implementations, the service provider associated with the hotspot 19 (or the network operations center 18) may not be a wireless carrier with a subscriber base; however, this service provider may have one or more agreements with such wireless carriers or service providers. As discussed below, advertisement server 22 is operative to provide requested access or service provider or subscription information to hotspots for advertising to one or more wireless clients.

As FIG. 1A illustrates, in one implementation, advertisement server 22 may be located remotely from hotspot 19. In one implementation, authentication Authorization and Account (AAA) server 20, an advertisement server 22, a database 24 may be located in a LAN of a service provider system such as a network operation center (NOC) 18, remote from wireless access points 50. Other implementations are possible. For example, FIG. 1B is a topological diagram of the components in a wireless local area network (WLAN) system, according to another implementation of the present invention, where advertisement server 22 is co-located with wireless access points 50 on the same LAN 30a.

As FIGS. 1A and 1B illustrate, a hotspot 19 may comprise one or more wireless access points. While hotspot 19 is illustrated as including four access points, in other implementations, hotspot 19 may contain fewer or more access points. LANs 30a and 30b may be implemented by a switch (or an array of switches) and/or other network devices, such as a bridge. As FIG. 1A illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between authentication server 20, advertisement server 22, and wireless clients via wireless access points 50. Of course, network 52 can include a variety of network segments, transmission technologies and components, such as terrestrial WAN links (wired or wireless), satellite links, optical fiber links, and cellular links. Network 52 could also be a campus LAN. LAN 30 may be a LAN, LAN segments implemented by an Ethernet switch (not shown), or an array of switches having multiple ports to which wireless access points 50 are connected. The wireless access points 50 are typically connected to switch ports via Ethernet links; however, other link layer connection protocols or communication means can be employed.

The wireless access points 50 are operative to wirelessly communicate with remote wireless client devices 60a and 60b. In one implementation, the wireless access points 50 implement the wireless network protocol specified in the IEEE 802.11 WLAN specification. The wireless access points 50 may be autonomous or so-called "fat" wireless access points, or light-weight wireless access points operating in connection with a wireless switch (see FIG. 1C). In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes, offered by Cisco Systems, Inc. of San Jose, Calif., operative to manage one or more wireless switches and access points.

B.2. Central Controller

FIG. 1C illustrates a hierarchical wireless network including a central controller 70 according to one implementation of the present invention. In one implementation, the central controller 70 may be implemented as a wireless domain server (WDS) or, alternatively, as a wireless switch. If the central controller 70 is implemented with a WDS, the central controller 70 is operative to communicate with autonomous or so-called "fat" wireless access points. If the central controller 70 is implemented as a wireless switch, the central controller 70 is operative to communicate with light-weight wireless access points and process wireless protocol and network management information. As FIG. 1B illustrates, a central controller 70 may be directly connected to one or more access points 50. Alternatively, a central controller 43 may be operably connected to one or more access points over a switched and/or routed network environment, as FIG. 1A illustrates.

Figure 1D:
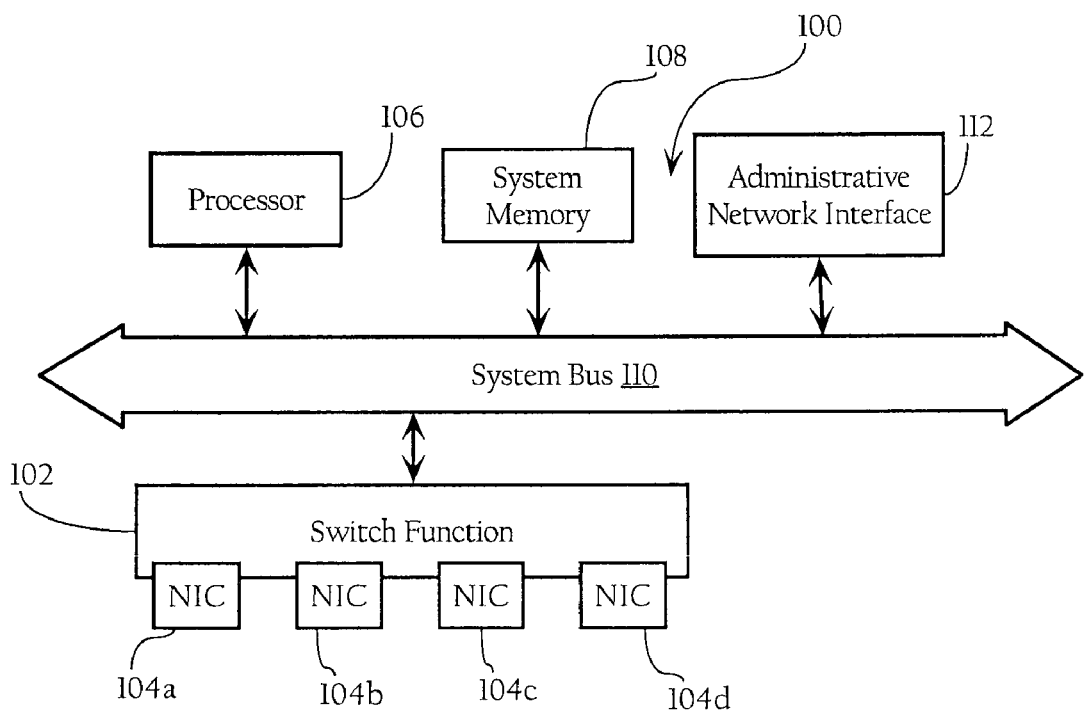
FIG. 1D illustrates for didactic purposes a hardware system, which may be used to implement a central controller.

FIG. 1D illustrates for didactic purposes a hardware system 100, which may be used to implement a central controller. As FIG. 1D shows, in one implementation, the central control elements each comprise a switch function or fabric 102 comprising a network interface 104a (e.g., an Ethernet adapter) for connection to network 30b and network interfaces 104b, 104c, and 104d for connection to wireless access points. This switch function or fabric is implemented to facilitate connection to the access elements. Central controller 70, in one implementation, further comprises a processor 106, a memory 108, one or more software modules, stored in memory 108, including instructions for performing the functions described herein, and a system bus 110 operably connecting these components. The central control elements may optionally include an administrative network interface 112 allowing for administrative access for such purposes as configuration and diagnostic access. In other implementations, central controller 70 includes a single network interface.

B.3. Advertisement Server

FIG. 2 illustrates for didactic purposes a hardware system 200, which may be used to implement an advertisement server 22. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist with the components of hardware system 200 being coupled to the single bus. Furthermore, hardware system 200 may include additional components, such as additional processors, storage devices, or memories.

As discussed above, in one embodiment, the operations of advertisement server 22 described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like.

B.4. Wireless Access Point

FIG. 3 illustrates for didactic purposes a hardware system 300, which may be used to implement a wireless access point 50. In one implementation, the wireless access point 300 includes a processor 310, a memory 312, a network interface 314 (e.g., an 802.3 interface) for communication with a LAN, a cache 316 for storing WLAN information, a persistent memory 318, a wireless network interface 320 (e.g., an IEEE 802.11 WLAN interface) for wireless communication with one or more wireless clients 60, and a system bus 322 interconnecting these components. The wireless access points 50 may also include software modules (including Dynamic Host Configuration Protocol (DHCP) clients, transparent bridging, Lightweight Access Point Protocol (LWAPP), Cisco® Discovery Protocol (CDP) modules, wireless access point modules, Simple Network Management Protocol (SNMP) functionality, etc., and device drivers (e.g., network and WLAN interface drivers) stored in persistent memory 318 (e.g., a hard disk drive, flash memory, EEPROM, etc.). At start up, these software components are loaded into system memory 312 and then accessed and executed by processor 310.

B.5. Wireless Client

FIG. 4 illustrates for didactic purposes a hardware system 400, which may be used to implement a wireless client 60. In one embodiment, hardware system 400 includes a processor 402 and a cache memory 404 coupled to each other as shown. Additionally, hardware system 400 includes a high performance input/output (I/O) bus 406 and a standard I/O bus 408. A host bridge 410 couples processor 402 to high performance I/O bus 406, whereas an I/O bus bridge 412 couples the two buses 406 and 408 to each other. Hardware system 400 also includes a wireless network interface 424 having a radio and antenna 425, a system memory 414, and a video memory 416 coupled to bus 406. In turn, a display device 418 couples to video memory 416. A mass storage 420, a keyboard and pointing device 422, and I/O ports 426 couple to bus 408. Collectively, these elements are intended to represent a broad category of computer hardware systems, including but not limited to general purpose computer systems based on the Pentium® processor manufactured by Intel Corporation of Santa Clara, Calif., as well as any other suitable processor.

The remaining elements of hardware system 400 are described below. In particular, wireless network interface 424 provides communication between hardware system 400 and any of a wide range of wireless networks, such as a WLAN (i.e., IEEE 802.11), WiMax (i.e., IEEE 802.16), Cellular (e.g., GSMA), etc. Mass storage 420 provides permanent storage for the data and programming instructions to perform the above described functions implemented in the system controller, whereas system memory 414 (e.g., DRAM) is used to provide temporary storage for the data and programming instructions when executed by processor 402. I/O ports 426 are one or more serial and/or parallel communication ports that provide communication between additional peripheral devices, which may couple to hardware system 400.

Hardware system 400 may include a variety of system architectures; and various components of hardware system 400 may be rearranged. For example, cache 404 may be on-chip with processor 402. Alternatively, cache 404 and processor 402 may be packed together as a "processor module," with processor 402 being referred to as the "processor core." Furthermore, certain implementations of the present invention may not require nor include all of the above components. For example, the peripheral devices shown coupled to standard I/O bus 408 may couple to high performance I/O bus 406. In addition, in some implementations only a single bus may exist, with the components of hardware system 400 being coupled to the single bus. Furthermore, hardware system 400 may include additional components, such as additional processors, storage devices, or memories.

In one embodiment, the operations of wireless client-side functionality are implemented as a series of software routines run by hardware system 400. These software routines, which can be embodied in a wireless network interface driver, comprise a plurality or series of instructions to be executed by a processor in a hardware system, such as processor 402. Initially, the series of instructions are stored on a storage device, such as mass storage 420. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 424. The instructions are copied from the storage device, such as mass storage 420, into memory 414 and then accessed and executed by processor 402. In alternate embodiments, the present invention is implemented in hardware or firmware.

While FIG. 4 illustrates, for didactic purposes, the hardware architecture of a wireless client according to one implementation of the present invention, the wireless client may, however, be implemented on a wide variety of computer system architectures, such as special purpose, hand held or portable devices, Personal Digital Assistants (e.g., converged devices which support WLAN data+voice), Laptop computers, and the like. An operating system manages and controls the operation of hardware system 400, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP operating system and/or Windows® CE (WinCE) operating system, available from Microsoft Corporation of Redmond, Wash. However, the present invention may be used with other operating systems, such as the Apple Macintosh Operating System, available from Apple Computer Inc. of Cupertino, Calif., UNIX operating systems, LINUX operating systems, Symbian operating systems, and the like.

C. Transmission of Advertisement Frames with B-SA Beacons

The wireless network infrastructure at hotspot 19 delivers advertisements for service provider information. In one implementation, advertisement of service provider information is integrated into the transmission of wireless management frames, such as beacon frames. In some WLAN standards, wireless access points transmit beacon frames at regular intervals (e.g., 100 milliseconds). Beacon frames may contain information related to various wireless network management operations. For example, beacon frames can contain counters indicating the number of beacon frame intervals until a specific beacon frame type (e.g., a DTIM beacon) will be transmitted. DTIM beacons are used to signal the presence of broadcast or unicast traffic to one or more wireless clients operating in a power save mode. Since wireless clients associated with the wireless access point know the beacon frame interval, and the number of beacon frames until the next DTIM beacon, the wireless clients operating in a power save mode can turn off their radios to conserve power, and power the radios in time to receive the beacon frame and determine whether any broadcast or other traffic is to be transmitted. In one implementation, the present invention includes advertising scheduling information in selected beacon frames (BS-A beacon frames) to allow wireless clients (although not associated with an access point) to enter a similar power save mode; however, in this implementation, the wireless clients power their radios to receive BS-A beacons. FIG. 5 is a timeline illustrating the transmission of beacon frames, including DTIM and B-SA beacons, at regular intervals.

In one implementation, the service provider information corresponds to a first service provider directly associated with the hotspot 19 (and/or network operations center 18), and/or one or more service providers associated with the first service provider pursuant to a roaming or other agreement. As described below in more detail, in one implementation, a wireless access point broadcasts a start-of-advertisement (B-SA) beacon frame (B-SA beacons), which indicates whether advertisement frames (AFs) will follow, and marks the start of transmission of the AFs. B-SA beacons enable a wireless client to enter a power-save state while it waits for the time at which the wireless access point will transmit a B-SA beacon. Just before that time, the wireless client comes out of the power-save state to receive the B-SA beacon. Because the wireless client can enter the power-save state while waiting for the advertisements, its battery energy is conserved.

FIG. 5 illustrates the flow of a sequence of beacon transmissions according to one implementation of the present invention. As FIG. 5 illustrates, a given wireless access point 50a servicing the hotspot, broadcasts beacons, which, in one implementation, may include delivery traffic indication message (DTIM) beacons followed by broadcast (BC) and/or multicast (MC) frames, start-of-advertisement (B-SA) beacon followed by one or more advertisement frames (AFs), and other types of beacons.

In one implementation, a B-SA beacon is a non-DTIM beacon that marks the start of service provider advertising. The importance of the B-SA beacon is that a wireless client may enter a power-save state while it waits for the time at which a B-SA beacon will be transmitted. Just before that time, the wireless client comes out of the power-save state to receive the B-SA beacon. Because the wireless client can enter the power-save state while waiting for the advertisements, its battery power is conserved. In one implementation, B-SA beacons are offset from DTIM beacons by at least one beacon interval. This is preferable for two reasons. The first is so that normal power-save wireless clients associated with the access point do not have to listen for advertising frames, wasting power in so doing. The second is so that the wireless client requesting service provider information through the advertising service does not have to waste battery energy listening to other broadcast/multicast frames that the wireless client is not interested in. However, in some implementations, the timing of B-SA beacons and DTIM beacons can overlap.

In one implementation, the wireless access point may transmit the B-SA beacon at an interval of N times the DTIM interval, where N is a configurable number. In one implementation, a system administrator may configure N to provide the B-SA interval (e.g., 1 to 2 seconds or higher). In one implementation, other beacon frames transmitted by the wireless access point contains a BS-A counter that counts down the number of beacons until the B-SA beacon. When the counter reaches zero, the transmitted beacon is a B-SA beacon. Because of this counter, a wireless client can predict when a B-SA beacon will be transmitted and come out of power-save state just in time to receive it. Immediately after transmitting a B-SA beacon, the wireless access point will commence transmitting advertisements (i.e., AFs), if available.

In one implementation, beacon frames indicate support for one or more advertising service types (e.g., low-power generic advertising service), and a B-SA counter indicating the number of beacon frame until a B-SA beacon. In one implementation, a B-SA beacon further comprises a bit or other indicator that signals whether the wireless access point has any queued advertising frames (AF) to send. If the wireless access point does, it commences transmission as illustrated in FIG. 5. The bit or flag in the B-SA beacon, if set, causes the wireless clients to keep their radios power to receive the advertising frames. If the bit or flag is not set, the wireless clients may go back into a power-save state. Once transmission of advertising frames commence, the wireless access point uses an MORE data bit in the frame header to indicate whether additional AFs are queued for transmission. If the MORE data bit is clear (e.g., MORE data bit=0), there are no more frames queued, and the wireless client can go back into a power-save state. If the MORE data bit is set (e.g., MORE data bit=1), the wireless client should continue receiving advertising frames.

In one implementation, advertisements may be clear text, multicast transmissions in 802.11 data frames. In one implementation, for Layer 2 advertisements, which have a corresponding ethertype, the encapsulation will use that ethertype. In one implementation, for higher layer (e.g., application layer) advertisements requested by a well-known port number, which have no defined ethertype, the advertisement may be encapsulated in an Ethernet frame with a generic advertising service ethertype; this essentially provides a Layer 2 container to transport these higher-layer frames to the client without the need for the client to have and IP address.

Figure 6:
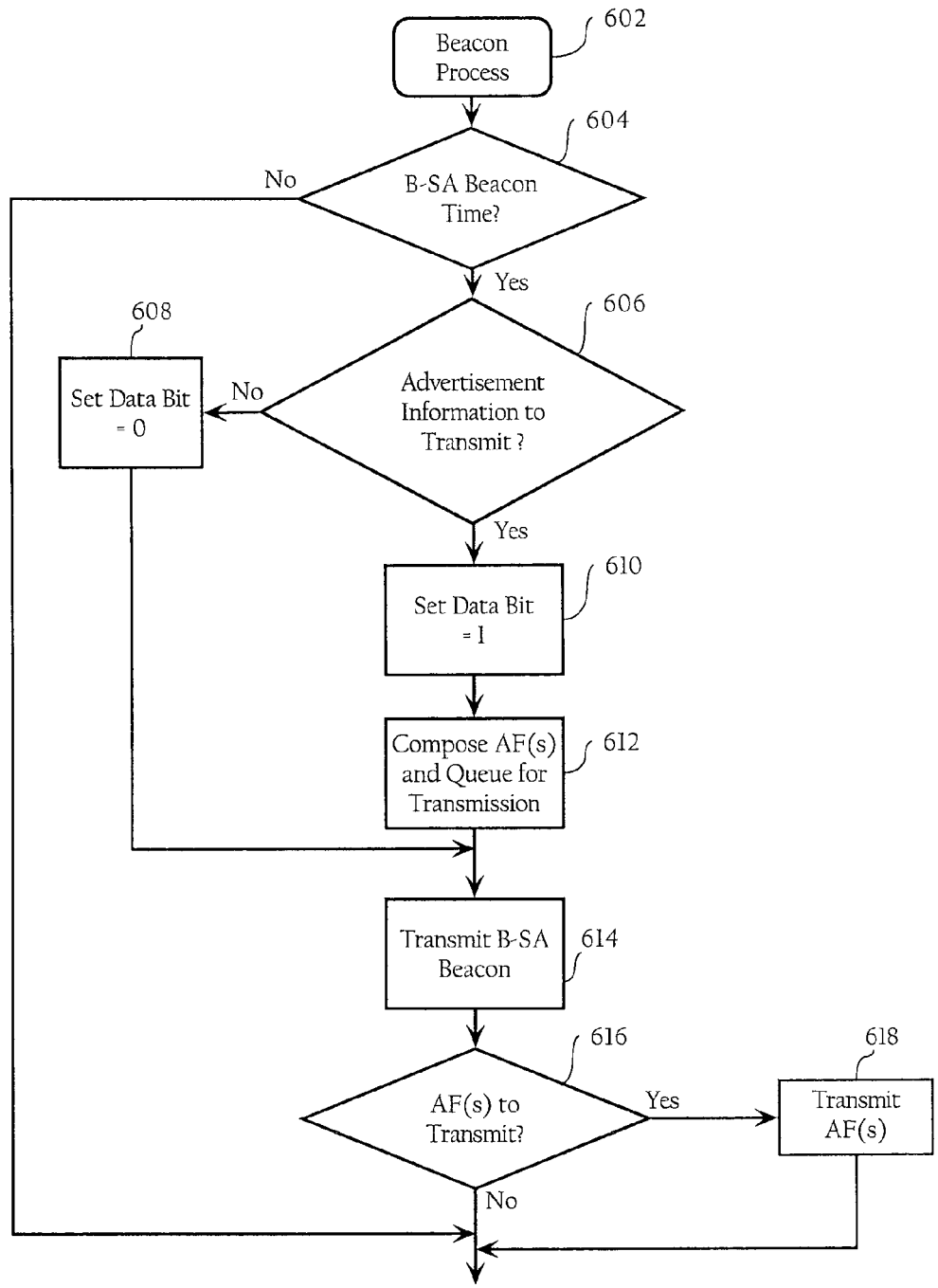
FIG. 6 is a flow chart illustrating a process flow, according to one implementation of the present invention, implemented at a wireless access point.

FIG. 6 is a flow chart illustrating a process flow, according to one implementation of the present invention, implemented at a wireless access point 50*a*. As FIG. 6 illustrates, wireless access point 50*a*, as part of the processes associated with transmission of beacon frames (602), determines if it is B-SA beacon time (604) (i.e., the time at which the wireless access point will transmit a B-SA beacon). Next, wireless access point 50*a* determines if there is advertising information to transmit (606). How advertising information is obtained is discussed below. If not, an MORE data bit is set to zero (608) and wireless access point 50*a* transmits a B-SA beacon (614). As described above, in one implementation, the MORE data bit included in the B-SA beacon indicates to a wireless client whether any AFs are to follow the B-SA beacon. As described above, in one implementation, an MORE data bit set to zero indicates that no AFs are to follow the B-SA beacon, while an MORE data bit set to one may indicate that one or more AFs are to follow. If wireless access point 50*a* determines that there is advertisement information to transmit (606), wireless access point 50*a* sets the MORE data bit to one (610), composes one or more AFs, and queues the AFs for transmission (612). Next, wireless access point 50*a* transmits the B-SA beacon (614). Following the B-SA beacon, the wireless access point 50*a* transmits one or more AFs, if any (616, 618).

In one implementation, wireless access point 50*a* may provide a generic-advertising-service capability advertisement in transmitted beacon frames and/or Probe Response frames. This allows a wireless client device to know that an advertising query of some sort is supported. The capability advertisement in the Beacon/Probe Response frames, in one implementation, includes information on which advertising protocols are supported by the wireless network. In one implementation, identification of the advertising protocol supported by the AP may include the user of ethertypes and/or well-known port numbers in the capability advertisement. In another implementation, a specific enumeration of the protocols can be used.

D. Request for Advertisements by the Wireless Client

The following describes a process where a wireless client 60 may obtain service provider advertising information from the wireless network. In one implementation, a wireless client may scan for and select a WLAN, and request service provider information by sending a probe request including an Advertising Request Information Element (AR-IE). In one implementation, the wireless client receives a probe response containing advertising scheduling information. The wireless client, after receiving the probe response, can enter a power-save state and then wake up just before the wireless access point transmits the B-SA beacon.

Figure 7:
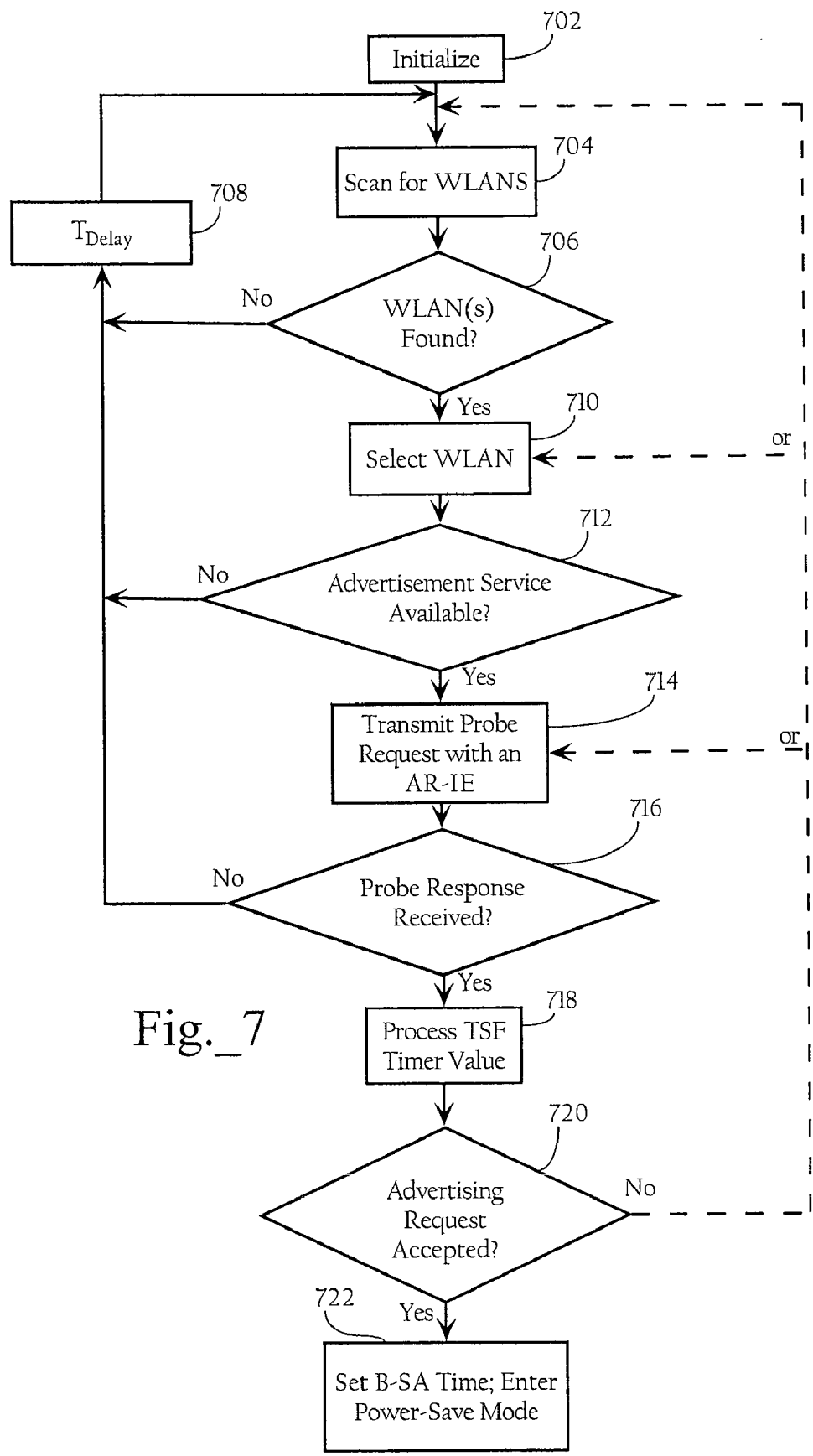
FIG. 7 is a flow chart illustrating a process flow, according to one implementation of the present invention, implemented at a wireless client.

FIG. 7 is a flow chart illustrating a process flow, according to one implementation of the present invention, implemented at a wireless client 60. As FIG. 7 shows, wireless client 60 initializes (702), and scans for WLANs (704). Next, wireless client 60 determines if a WLAN is found (706). If wireless client 60 finds one or more WLANs, wireless client 60 selects one of the identified WLANs (710). If wireless client 60 does not find a WLAN, wireless client 60 waits for a time period $T_{Delay}$ (708) before rescanning for WLANs (704). Next, wireless client 60 determines whether an advertisement service is available (712). As discussed above, the wireless access points transmit beacon frames that indicate the ability to provide service provider advertisements. If not, wireless client 60 waits for a time period $T_{Delay}$ (708) before either rescanning for WLANs (704), selecting another WLAN identified in a previous scan (710), or attempting association with the selected WLAN without requesting service provider advertisements.

If wireless client 60 determines that an advertisement service is available (712), wireless client 60 transmits a probe request including an AR-IE (714). In one implementation, the AR-IE includes an advertising service protocol type (e.g., subscription service provider network (SSPN) advertising service) identifying the specific advertising protocol it desires to use, along with a service provider query requesting information relating to one or more service providers or other subscription information. In one implementation, the SSPN advertising service may provide SSPN, extended service set identifier (ESSID), SSID, roaming partners, available services including Internet access, VoIP, e911, online enrollment capabilities, as well as other inter-working capabilities. In one implementation, the AR-IE also supports queries for specific SSPN including regular expression matching, and/or wildcards. In one implementation, the service provider query may request advertisements from a service provider having a specific identification, advertisements from all of the services providers of one or more particular classes/categories, or advertisements from all service providers.

Next, wireless client 60 determines whether a probe response is received (716). If the probe response times out (716), wireless client 60, in one implementation, waits for a time period $T_{Delay}$ (708) before rescanning for WLANs (704). In another implementation, if the Probe Request times out, wireless client 60 re-transmits the Probe Request a limited number of times; if no AP responds to any of these re-transmitted Probe Requests, wireless client 60 waits for a time period $T_{Delay}$ (708) before rescanning for WLANs. If wireless client 60 receives a probe response, wireless client 60 processes the timing synchronization function (TSF) timer value in the probe response (718). In one implementation, the probe response includes an advertising response information element that provides advertisement scheduling information (e.g., when wireless access point 50a will transmit B-SA beacons), enabling wireless client 60 to synchronize with wireless access point 50a and predict when wireless access point 50a will transmit B-SA beacons. In one implementation, the advertising scheduling information is a counter indicating the number of beacon frames until the B-SA beacons. In one implementation, the advertising response information element also indicates whether the advertising request transmitted by the wireless client has been accepted or rejected. As discussed below, an advertising request may be rejected, because the requested advertising service protocol type is not supported, and/or because the advertising service query is not valid or violates a policy. If the advertising service request is accepted (720), wireless client determines the B-SA beacon time based on the TSF information and the B-SA counter value in the probe response, and enters a power save mode setting the wake up time based on the expected B-SA time (722). If the advertising service request is not accepted (720), the wireless client can respond in a number of ways, such as reformulating the advertising service request, selecting another WLAN identified during the previous scan, and scanning for WLANs. After wireless client 60 receives the B-SA beacon, wireless client 60 may go back to sleep if there are no AFs to follow or may stay awake to receive one or more AFs.

Accordingly, wireless client 60 may enter and exit the power conservation mode at regular intervals to receive service provider information (B-SA beacons and possibly AFs) transmitted by the wireless network. In one implementation, wireless client 60 enters and exits the power conservation mode by shutting down a radio of a wireless network interface and then re-powering the radio to receive the B-SA beacon and advertising frames. In one implementation, when wireless client 60 wakes up, it receives the B-SA beacon and AFs, and processes the AFs, if any. In one implementation, wireless client 60 may, based on the service provider information in the AF(s), determine that it has a valid subscription or other credentials, to gain wireless network access and proceeds to establish a connection with the wireless network. If the AFs do not identify a service provider or other access information supported by the wireless client, the wireless client may re-initiate a scan for WLANs and repeat the process discussed above.

E. Processing Requests for Advertisements

E.1. Remote Advertisement Server Scenario

Figure 8:
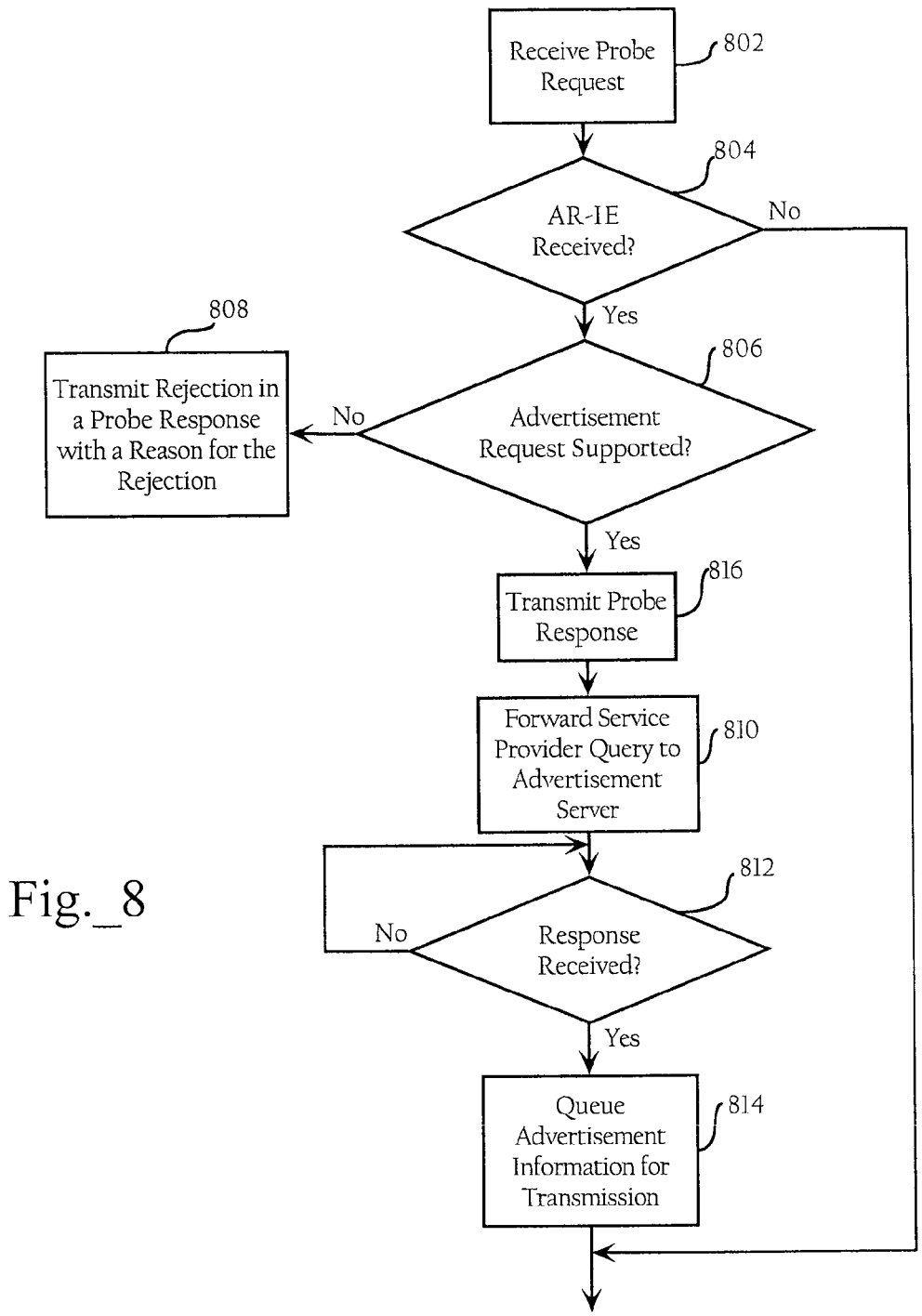
FIG. 8 is a flow chart illustrating a process flow, according to one implementation of the present invention, implemented at a wireless access point.

The following discussion associated with FIG. 8 is in connection with FIG. 1A where advertisement server 22 is located remotely from hotspot 19. Implementations in connection with FIG. 1B, where advertisement server 22 is collocated with hotspot 19, are discussed below in connection with FIGS. 9 and 10.

FIG. 8 is a flow chart illustrating a process flow, according to one implementation of the present invention, implemented at a wireless access point 50a. As FIG. 8 shows, wireless access point 50a receives a probe request (802). If the probe request contains an AR-IE (804), the wireless access point 50a processes it. In one implementation, wireless access point 50a determines whether the advertisement server 22 supports the advertisement request (806) (i.e., protocol type and query type). If the advertising service request is acceptable, wireless access point 50a transmits a probe response including an AR-IE (see above) (816). If the advertising service request is not acceptable, wireless access point 50a transmits a rejection in a probe response including an advertising response IE, which includes a status code indicating whether the request was accepted or rejected and, optionally, a reason for the rejection, such as unsupported protocol type, invalid query, etc. (808). Wireless access point 50a may reject the probe request for a variety of reasons. For example, the wireless network infrastructure may not support the advertising service at all, may not support the advertising service for the requested protocol type, or may have been configured to not accept certain query types (e.g., requests to deliver all available SSPN advertisements, since such a list may be too large). If the advertising request is supported, wireless access point 50a forwards the service provider query to advertisement server 22 (810).

In one implementation, wireless access point 50a may filter probe requests to prevent attacks against advertisement server 22 by a malicious wireless client. In one implementation, such filtering may be accomplished through the application of limitations to the character set allowed in a query, validation of the structure of the query, or application of construction rules to prevent injection of executable code into the advertisement server. In one implementation, the wireless network infrastructure manages bandwidth consumption over-the-air (OTA) and over-the-WAN such that it is less susceptible to a denial-of-service (DoS) attack, and wireless access point 50a may also limit the transmission rate of the probe request data allowed into the network if needed.

As FIG. 8 illustrates, when wireless access point 50a receives a response to the query from advertisement server 22 (812), it queues the advertisement information for transmission in one or more AFs (814), as discussed above in connection with FIGS. 5 and 6. In one implementation, wireless access point 50a, at each B-SA interval, formulates one or more advertising frames (up to a configurable AF limit per B-SA interval) based on the service provider information that has been queued or buffered for transmission. In one implementation, once the service provider information is transmitted in an AF, it is deleted from the queue or buffer. In another implementation, each service provider information unit is stored in the queue or buffer in connection with a replay counter. Each time the unit of information is transmitted in an AF, the replay counter is decremented. When the replay counter hits zero, the corresponding unit of information is deleted from the buffer or queue. In one implementation, if a subsequent advertising request yields the same information, another entry in the buffer can be created. Alternatively, the replay counter for the existing information unit can be reset. The use of a replay counter ensures that requested service provider information is transmitted in several AFs to increase the chances that the wireless client receives it.

E.2. Local Advertisement Server Scenario

Figure 9:
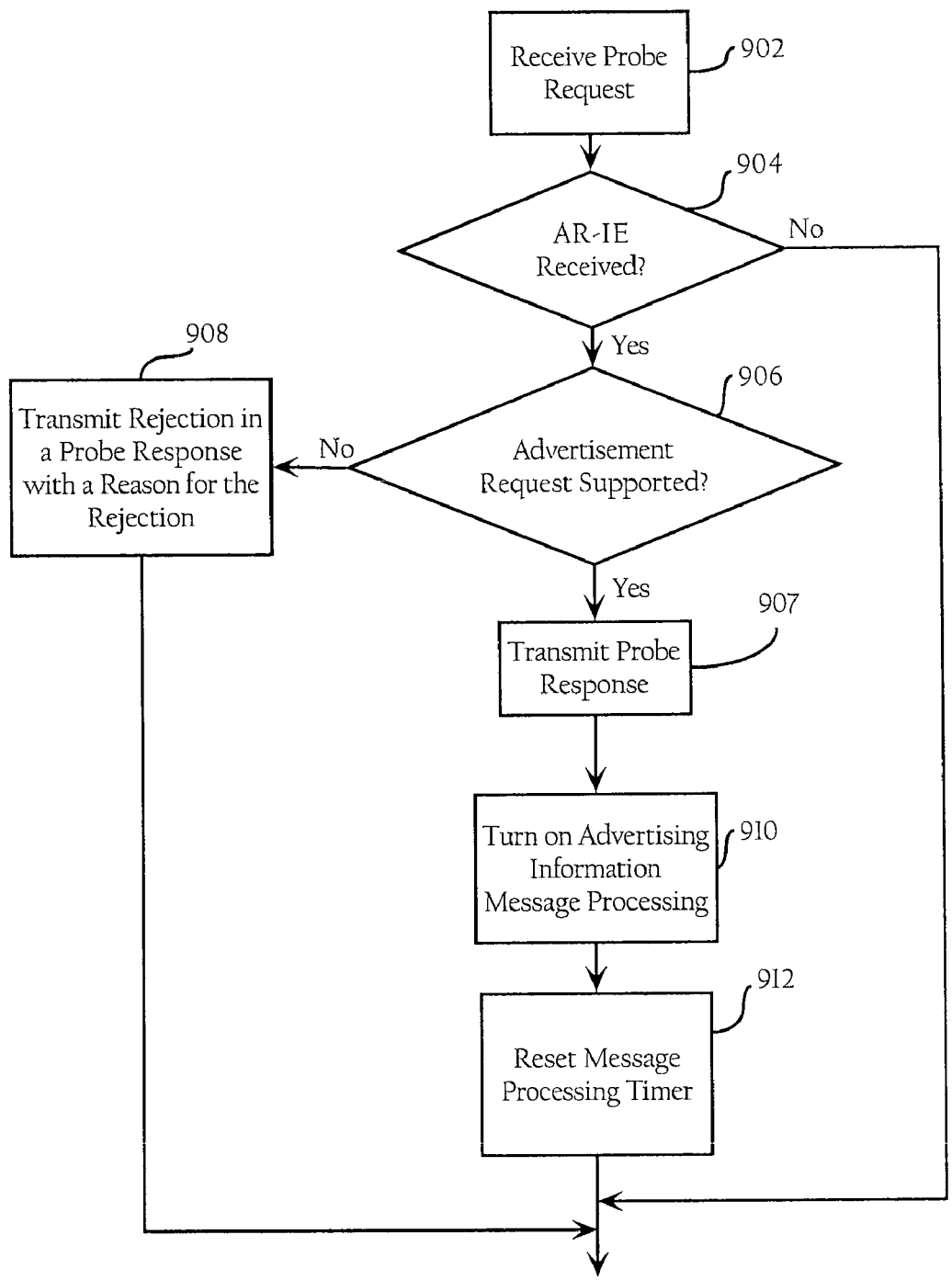
FIG. 9 is a flow chart illustrating a process flow, according to another implementation of the present invention, implemented at a wireless access point.

FIG. 9 is a flow chart illustrating a process flow, according to another implementation of the present invention, implemented at a wireless access point 50a. In one implementation, advertisement server 22 is configured to broadcast, multicast, and/or unicast service provider information to one or more elements of the wireless network on a repeating basis. As discussed below, the elements of the wireless network, such as access points, can conditionally process the messages transmitted from advertisement server 22 in response to probe requests that include AR-IEs.

As FIG. 9 illustrates, similar to the process flow described in FIG. 8, wireless access point 50*a* receives a probe request (902) and determines if it includes an AR-IE (904). If not, wireless access point 50*a* performs other processing not illustrated in FIG. 9. Otherwise, wireless access point 50*a* determines whether the advertisement server 22 supports the advertisement request (906) (i.e., protocol type and query type). If the advertisement request is not supported, wireless access point 50*a* transmits a rejection in a probe response including a response IE, which includes a status code indicating whether the request was accepted or rejected and, optionally, a reason for the rejection (908). The process flow of FIG. 9 differs from that of FIG. 8 in that if the advertisement request is supported, wireless access point 50*a* transmits a probe response (907), turns on processing of advertising information messages transmitted by advertising server 22 (910), and resets a processing timer (912). In one implementation, the processing timer reflects a configurable time period (e.g., 10-15 seconds), during which wireless access point 50*a* accepts and processes advertising information messages from advertisement server 22. After the message processing time expires (assuming it has not been reset by a subsequent request), wireless access point 50 turns off processing of advertising messages, discarding the advertising messages until processing is again turned on. Because advertisement server 22, in one implementation, provides the advertising service as a Layer 2, or broadcast or multicast service, wireless access point 50*a*, during advertising processing, accepts broadcasted advertising information, or joins then leaves the multicast for the preconfigured time period (e.g., 10-15 seconds).

FIG. 10 is a flow chart illustrating a process flow, according to one implementation of the present invention, implemented at a wireless access point 50*a*. As FIG. 10 shows, wireless access point 50*a* receives an advertisement message from advertisement server 22 (1002). Next, wireless access point 50*a* determines whether advertisement processing is on (1004). In one implementation, the advertisement processing would be on if wireless access point 50*a* had received a probe request including an AR-IE (see FIG. 9). If advertisement processing is off, wireless access point 50*a* discards the advertisement message (1006). As described above, in one implementation, wireless access point 50*a* discards the advertisement message. Otherwise, wireless access point 50*a* queues the advertisement information for transmission in one or more AFs (1008).

F. Security

The implementations describe above provide numerous benefits. In additional implementations, the probe requests transmitted to the wireless network can be configured to achieve various security objectives. In one implementation, the implementations described above provide user anonymity. User anonymity is important because it helps to prevent the roaming habits of a particular user from being learned by networks or eavesdroppers merely by monitoring its probing behavior (i.e., discovering the supported networks, but not actually associating and using those services). In one implementation, anonymity is achieved by the following method. When the wireless client transmits the AR-IE in the Probe Request, the wireless client does not use its normal MAC address which was configured at its time of manufacture. Instead, the wireless client uses the MAC address of the wireless access point (e.g., basic service set identifier (BSSID)) with the "locally administered" bit set. The possibility of several wireless clients simultaneously requesting the advertising service using the MAC address is not a problem, because, in one implementation, the wireless access point never unicasts the requested information back to the wireless client. Instead, the wireless access point transmits the advertisement information back to the wireless client with a Layer 2 broadcast address or a Layer 2 multicast address.

The present invention has been explained with reference to specific embodiments. For example, while embodiments of the present invention have been described as operating in connection with IEEE 802.11 networks, the present invention can be used in connection with any suitable wireless network environment. In addition, the advertising service discussed above can be used to provide other information in addition to, or in lieu of, service provider information. Other embodiments will be evident to those of ordinary skill in the art. It is therefore not intended that the present invention be limited, except as indicated by the appended claims.

What is claimed is:

1. A data storage medium encoded with computer executable instructions for acquiring information from a wireless network, the computer executable instructions when executed operable to cause a processor to:
   prior to associating with a wireless network, transmit a query to the wireless network for network services information;
   receive a response containing advertising service scheduling information, the advertising service scheduling information comprising a schedule for delivery of the network services information;
   configure a power conservation mode responsive to the advertising service scheduling information;
   exit, responsive to the advertising scheduling information, the power conservation mode to receive one or more messages including the network services information; and
   use the network services information to establish a wireless connection to the wireless network.

2. The data storage medium of claim 1 wherein the network services information comprises service provider information.

3. The data storage medium of claim 1 wherein the computer executable instructions are operable to scan for one or more wireless networks that support an advertising service capability.

4. The data storage medium of claim 1 wherein the query is a regular expression query for subscription service provider information.

5. The data storage medium of claim 1 wherein the query is embodied in an information element appended to a probe request transmitted to the wireless network.

6. The data storage medium of claim 5 wherein the probe request has a non-globally unique source address.

7. The data storage medium of claim 1 wherein the computer executable instructions are operable to responsive to the received service provider information, conditionally associate with the wireless network.

8. The data storage medium of claim 1 wherein the computer executable instructions are further operable to cause the processor to:
   de-power a radio of a wireless network interface; and
   re-power the radio to receive the network services information.

9. The data storage medium of claim 1 wherein the query identifies a particular service provider.

10. The data storage medium of claim 1 wherein the query identifies a class of service providers.

11. A method for acquiring information from a wireless network, the method comprising:
prior to associating with a wireless network, transmitting a query to the wireless network for network services information;
receiving a response containing advertising service scheduling information, the advertising service scheduling information comprising a schedule for delivery of the network services information;
configuring a power conservation mode responsive to the advertising service scheduling information;
exiting, responsive to the advertising scheduling information, the power conservation mode to receive one or more messages including network services information; and
using the network services information to establish a wireless connection to the wireless network.

12. The method of claim 11 wherein the network services information comprises service provider information.

13. The method of claim 11 further comprising scanning for one or more wireless networks that support an advertising service capability.

14. The method of claim 11 wherein the query is a regular expression query for subscription service provider information.

15. The method of claim 11 wherein the query is embodied in an information element appended to a probe request transmitted to the wireless network.

16. The method of claim 15 wherein the probe request has a non-globally unique source address.

17. The method of claim 11 further comprising: responsive to the received service provider information, conditionally associating with the wireless network.

18. The method of claim 11 wherein the computer executable instructions are further operable to cause the processor to:
de-powering a radio of a wireless network interface; and
re-powering the radio to receive the network services information.

19. The method of claim 11 wherein the query identifies a particular service provider.

20. The method of claim 11 wherein the query identifies a class of service providers.

21. A data storage medium encoded with computer executable instructions for providing service provider information, the computer executable instructions when executed operable to cause a processor to:
access a service provider query transmitted by a wireless client, prior to establishing a wireless connection with the wireless client;
transmit an advertisement response containing advertising service scheduling information to the wireless client, the advertising service scheduling information comprising a schedule for transmission of service provider information responsive to the query;
obtain the service provider information responsive to the query; and
transmit, after obtaining the service provider information, one or more advertising frames containing the service provider information.

22. The data storage medium of claim 21 wherein the computer executable instructions are further operable to cause the processor to apply one or more policies to the service provider query.

23. The data storage medium of claim 21 wherein the computer executable instructions are further operable to cause the processor to indicate an advertising service capability to one or more wireless clients.

24. A method for providing service provider information to one or more wireless clients, the method comprising:
accessing, at an access point, a service provider query transmitted by a wireless client, prior to establishing a wireless connection between the wireless client and the access point;
transmitting an advertisement response containing advertising service scheduling information to the wireless client, the advertising service scheduling information comprising a schedule for transmission of service provider information responsive to the query;
obtaining the service provider information responsive to the query; and
transmitting, after obtaining the service provider information, one or more advertising frames containing the service provider information.

25. The method of claim 24 further comprising applying one or more policies to the service provider query.

26. The method of claim 24 further comprising indicating an advertising service capability to one or more wireless clients.

* * * * *